(12) United States Patent
Ivanovici et al.

(10) Patent No.: US 9,359,675 B2
(45) Date of Patent: Jun. 7, 2016

(54) PRODUCING TWO-DIMENSIONAL SANDWICH NANOMATERIALS BASED ON GRAPHENE

(75) Inventors: Sorin Ivanovici, Heidelberg (DE); Shubin Yang, Mainz (DE); Xinliang Feng, Mainz (DE); Klaus Müllen, Köln (DE)

(73) Assignees: BASF SE, Ludwigshafen (DE); Max-Planck-Gesellschaft zur Förderung der Wissenschaften e.V., München (DE)

( * ) Notice: Subject to any disclaimer, the term of this patent is extended or adjusted under 35 U.S.C. 154(b) by 110 days.

(21) Appl. No.: 13/091,674

(22) Filed: Apr. 21, 2011

(65) Prior Publication Data

US 2011/0268647 A1 Nov. 3, 2011

Related U.S. Application Data

(60) Provisional application No. 61/326,673, filed on Apr. 22, 2010.

(51) Int. Cl.

| | |
|---|---|
| B01J 21/18 | (2006.01) |
| B01J 27/20 | (2006.01) |
| B05D 5/12 | (2006.01) |
| H01B 1/04 | (2006.01) |
| C01B 31/04 | (2006.01) |
| B05D 7/00 | (2006.01) |
| B82Y 40/00 | (2011.01) |
| B82Y 30/00 | (2011.01) |
| C23C 18/12 | (2006.01) |
| B01J 21/08 | (2006.01) |
| B01J 23/74 | (2006.01) |
| B01J 23/75 | (2006.01) |
| B01J 35/10 | (2006.01) |
| B01J 37/02 | (2006.01) |
| B01J 37/03 | (2006.01) |

(52) U.S. Cl.
CPC ............ *C23C 18/1212* (2013.01); *B01J 21/08* (2013.01); *B01J 21/18* (2013.01); *B01J 23/74* (2013.01); *B01J 23/75* (2013.01); *B01J 35/1061* (2013.01); *B01J 37/0201* (2013.01); *B01J 37/0203* (2013.01); *B01J 37/0205* (2013.01); *B01J 37/0207* (2013.01); *B01J 37/0211* (2013.01); *B01J 37/036* (2013.01); *B82Y 30/00* (2013.01); *B82Y 40/00* (2013.01); *C01B 31/0476* (2013.01); *C23C 18/122* (2013.01); *C23C 18/1216* (2013.01); *C23C 18/1225* (2013.01); *C23C 18/1245* (2013.01); *C23C 18/1254* (2013.01); *C23C 18/1295* (2013.01); *C01B 2204/32* (2013.01)

(58) Field of Classification Search
CPC ............ B01J 21/08; B01J 23/74; B01J 23/75; B01J 35/1061; B01J 37/0201; B01J 37/0203; B01J 37/0205; B01J 37/0207; B01J 37/0211; B01J 37/036; C23C 18/1295; C23C 18/1212; B82Y 30/00; B82Y 40/00; C01B 31/0476
USPC ......................................................... 423/448
See application file for complete search history.

(56) References Cited

U.S. PATENT DOCUMENTS

| | | | |
|---|---|---|---|
| 2010/0176351 A1* | 7/2010 | Ruoff et al. | ................ 252/510 |
| 2011/0201190 A1 | 8/2011 | Hermes et al. | |
| 2011/0240973 A1 | 10/2011 | Dueggeli et al. | |

FOREIGN PATENT DOCUMENTS

| | | |
|---|---|---|
| WO | WO 2010/014215 A2 | 2/2010 |
| WO | WO 2010/030361 A1 | 3/2010 |

OTHER PUBLICATIONS

Fitzer, et al., Recommended Terminology for the Description of Carbon as a Solid, Pure & Appl. Chem. 1995; 67(3), 473-506.*
Scientific Background on the Nobel Prize in Physics 2010 GRAPHENE, The Royal Swedish Academy of Sciences, pp. 1-10 (Oct. 5, 2010).*
Vadukumpully, et al., Cationic surfactant mediated exfoliation of graphite into graphene flakes, Carbon 2009; 47: 3288-3294.*
Zhang, et al., Improving the water-wettability and oxidation resistance of graphite using Al¬ 2)3/SiO2 sol-gel coatings, Journal of the European Ceramic Society 2003; 23: 1215-1221.*

(Continued)

*Primary Examiner* — Daniel C McCracken
(74) *Attorney, Agent, or Firm* — Oblon, McClelland, Maier & Neustadt, L.L.P.

(57) ABSTRACT

Two-dimensional nanomaterials are produced in a process comprising the steps of
(a) providing
  (a1) a mixture comprising graphene oxide particles, water and at least one cationic surfactant and/or nonionic surfactant or
  (a2) a mixture comprising graphene particles, at least one solvent useful for solution exfoliation of graphite and at least one cationic surfactant and/or nonionic surfactant,
(b) adding at least one sol precursor compound to the mixture from step (a),
(c) reacting the mixture from step (b) in a sol/gel process to form gel from the at least one sol precursor compound on the graphene oxide particles or, respectively, the graphene particles,
(d) removing the at least one surfactant, and
(e) optionally heating the gel-coated graphene oxide particles for at least 1 min to at least 500° C. under inert gas atmosphere to reduce the graphene oxide to graphene.

18 Claims, No Drawings

(56) References Cited

OTHER PUBLICATIONS

Wang, et al., Ternary Self-Assembled of Ordered Metal Oxide-Graphene Nanocomposites for Electorchemical Energy Storage, ACSNANO 2010; 4(3): 1587-1595 (published online Feb. 25, 2010).*

"Hexadecyltrimethylammonium bromide," accessed online at http://www.sigmaaldrich.com/catalog/product/sigma/h5882?lang=en&region=US on Jul. 10, 2015.*

Watcharotone, et al, Graphene-Silica Composite Thin Films as Transparent Conductors, Nano Letters 2007; 7(7)L 1888-1892.*

Michael J. McAllister, et al. "Single Sheet Functionalized Graphene by Oxidation and Thermal Expansion of Graphite", Chem. Mater., vol. 19, No. 18, 2007, pp. 4396-4404.

U.S. Appl. No. 13/107,278, filed May 13, 2011, Ivanovici, et al.

Donghai Wang, et al., "Ternary Self-Assembly of Ordered Metal Oxide-Graphene Nanocomposites for Electrochemical Energy Storage", ACS NANO, vol. 4, No. 3, XP-002643941, 2010, pp. 1587-1595.

Xiao-Yan Zhang, et al., "Graphene/$TiO_2$ nanocomposites: synthesis, characterization and application in hydrogen evolution from water photocatalytic splitting", Journal of Materials Chemistry, vol. 20, XP-002644096, 2010, pp. 2801-2806.

Yunfeng Lu, et al., "Continuous formation of supported cubic and hexagonal mesoporous films by sol-gel dip-coating", Nature, vol. 389, XP-002474282, Sep. 25, 1997, pp. 364-368.

Anja Rumplecker, et al., "Hard Templating Pathways for the Synthesis of Nanostructured Porous $Co_3O_4$", Chem. Mater, 19, XP-002643942, 2007, pp. 485-496.

U.S. Appl. No. 61/304,849, filed Feb. 16, 2010, Hermes, et al.

U.S. Appl. No. 61/319,271, filed Mar. 31, 2010, Dueggeli, et al.

U.S. Appl. No. 14/115,934, filed Nov. 6, 2013, Wagenblast, et al.

U.S. Appl. No. 14/123,530, filed Dec. 3, 2013, Koenemann, et al.

Office Action issued on Dec. 15, 2014 in the corresponding Chinese Patent Application No. 201180020251.0.

Z.M. Wang, et al., "Surfactant-Mediated Synthesis of a Novel Nanoporous Carbon-Silica Composite", Chem. Mater. vol. 15, No. 15, 2003, pp. 2926-2935.

* cited by examiner

PRODUCING TWO-DIMENSIONAL SANDWICH NANOMATERIALS BASED ON GRAPHENE

This patent application claims the benefit of U.S. provisional patent application Ser. No. 61/326,673 filed Apr. 22, 2010, incorporated in its entirety herein by reference.

The present invention relates to a process for producing two-dimensional (2-D) nanomaterials and sandwich nanomaterials based on graphene or graphene oxide with coatings of carbon, metals or metal oxides and to the sandwich materials thus produced. The present invention further relates to the use of the 2-D sandwich nanomaterials as templates for producing further 2-D sandwich materials, to their use in catalysts, sensors, capacitors, primary and secondary electrochemical cells and fuel cells and also for producing graphene particles, and to a process for producing single layers of graphene from 2-D sandwich nanomaterials produced according to the present invention.

Two-dimensional (2-D) nanomaterials are materials in which two of the dimensions are in principle infinite, but the third dimension (thickness) is confined to the nanoscale. This results in a very large ratio of length to thickness for these mostly particulate materials. Graphene is a 2-D nanomaterial in that it comprises a planar layer of $sp^2$-hybridized carbon atoms fused into six-membered rings. Graphite is constructed of these graphene layers. Graphene has very high mechanical strength and high electrical conductivity. However, wide application of graphene and of graphene-based, functionalized 2-D nanomaterials is hindered by the difficulties encountered in the production of graphene.

Graphene was first produced by applying an adhesive strip to high oriented pyrolytic graphite (HOPG), pulling off the adhesive strip with graphite and any graphene layers adhering thereto, and transferring the layers to a silicon wafer. This method is still being used today to obtain very pure graphene particles, even though it is very time-consuming and low yield.

A further method is chemical vapor deposition (CVD) wherein a source of carbon is vaporized and deposited on a catalytic support. This does yield supported particles of graphene, but not suspension of "free" particles of graphene in a medium.

Graphene is also obtainable by epitaxial growth on metallic substrates. Heating SiC to temperatures above 1100° C. also leads to graphene. Both methods yield graphene-coated surfaces, but no "free" particles of graphene.

A further way to produce graphene particles is solution exfoliation of graphite, wherein graphite is exfoliated in organic solvents such as N-methylpyrrolidone into graphene particles owing to the positive interactions between the solvent and the graphite surface. Special solvents are needed for this, and so any further processing by applying further layers to functionalize the graphene, for example, is problematical. In addition, only low yields of monolayers are obtained, since the particles of graphene tend to quickly reassemble into stacks.

Graphene particles are further obtainable by chemical reduction of graphene oxide particles in aqueous suspension, although this will always leave behind in the graphene a certain proportion of oxidized groups. Although graphene oxide is readily dispersible in water owing to the many oxygen groups, the resulting anionic character is responsible for graphene oxide having an intrinsic incompatibility with inorganic compounds such as $SiO_2$. Moreover, graphene suspensions produced by reduction of aqueous graphene oxide suspensions make it extremely difficult to obtain individual particles of graphene, since these are dispersible in water only with great difficulty, if at all, and therefore aggregate.

Graphene oxide can also be converted into graphene by thermal means (Aksay, Chem. Mater. 2007, 19, pages 4396-4404). However, the graphene particles agglomerate at the high temperatures, making it difficult to obtain individual particles of graphene.

Nonetheless, owing to the positive properties of graphene, for example its high electron mobility, the resulting very good electrical conductivity and the room temperature quantum Hall effect, attempts to functionalize graphene continue.

WO 2010/014215 A2 describes a process for producing nanocomposites based on graphene and metal oxides, Graphite flakes are chemically oxidized and the resulting graphite oxide is exfoliated by rapid thermal expansion and partly converted into graphene. The exfoliated particles of graphene are used to produce aqueous dispersions comprising sodium dodecylsulfate to stabilize the particles. A metal oxide precursor is added to the dispersion and deposited on the dispersed particles of graphene to form the nanocomposite material. Owing to their method of making, the particles of graphene have a carbon/oxygen ratio in the range from 10 to 500. Owing to the oxygen atoms in the graphene particles, it is somewhat tricky to adsorb the anionic surfactant on their surface.

Graphene oxide, obtainable by oxidation of graphene and graphite and consisting of a layer of carbon atoms fused into six-membered rings, comprising oxygen-containing groups, is likewise useful as a starting point for the production of functionalized 2-D nanomaterials.

However, there continues to be a need for processes to produce graphene and to produce functionalized graphene and graphene oxide that avoid the above-mentioned disadvantages of the prior art, and also for 2-D nanomaterials based on graphene and graphene oxide and having good performance characteristics.

It is an object of the present invention to provide a process for producing graphene particles and functionalized graphene and graphene oxide particles in a comparatively simple manner and in high yield. There shall further be provided functionalized 2-D nanomaterials based on graphene and graphene oxide that have particularly good performance characteristics in the anode material of lithium ion secondary batteries for example.

We have found that this object is achieved according to the present invention by the following process for producing two-dimensional sandwich nanomaterials comprising the steps of (a) providing
   (a1) a mixture comprising graphene oxide particles, water and at least one cationic surfactant and/or nonionic surfactant or
   (a2) a mixture comprising graphene particles, at least one solvent useful for solution exfoliation of graphite and at least one cationic surfactant and/or nonionic surfactant,
(b) adding at least one sol precursor compound to the mixture from step (a),
(c) reacting the mixture from step (b) in a sot/gel process to form gel from the at least one sol precursor compound on the graphene oxide particles or, respectively, the graphene particles,
(d) removing the at least one surfactant, and
(e) optionally heating the gel-coated graphene oxide particles for at least 1 min to at least 500° C. under inert gas atmosphere to reduce the graphene oxide to graphene.

In a preferred embodiment, the at least one sol precursor compound is selected from $SiO_2$ precursor compounds. Proceeding from this embodiment, the present invention also provides a process for producing 2-D sandwich nanomaterials comprising the steps (a) to (d) and further the steps of (f) impregnating the $SiO_2$-coated graphene oxide particles or, respectively, the $SiO_2$-coated graphene particles with at least one precursor compound selected from the group consisting of metal oxide precursor compounds, metal precursor compounds and carbon precursor compounds, (g) converting the at least one precursor compound into the corresponding metal oxide, the corresponding metal or, respectively, carbon, and (h) removing the $SiO_2$ from the graphene oxide particles or, respectively, the graphene particles.

The present invention further provides 2-D sandwich nanomaterials obtainable according to the processes of the present invention, and also their use as templates for producing further nanolayer materials, their use as catalysts, sensors, capacitors, primary and secondary electrochemical cells and fuel cells, and also catalysts, sensors, capacitors, primary and secondary electrochemical cells and fuel cells comprising the 2-D sandwich nanomaterials of the present invention.

The present invention further provides the use of the 2-D sandwich nanomaterials of the present invention for producing graphene particles, and also a process for producing graphene particles comprising the steps (a) to (d) wherein the at least one sol precursor compound in step (b) is likewise selected from $SiO_2$ precursor compounds, and further step (h) removing the $SiO_2$ is carried out, wherein step (e) is carried out when step (a) provides a mixture according to (a1).

The present invention process for producing 2-D nanomaterials and 2-D sandwich nanomaterials based on graphene or graphene oxide is performable in a simple manner and with comparatively high throughputs, and leads to high yields of coated 2-D nanomaterials. These coated 2-D nanomaterials can be obtained with a large variety of different coatings, in which case the repeated sequence of impregnating and removing by the nanocasting process even makes it possible to produce coatings which are not obtainable directly. For example, nanocasting is used to produce graphene particles coated with mesoporous $CO_3O_4$ by using 2-D sandwich nanomaterials formed from $SiO_2$-coated graphene. Other 2-D nanomaterials coated with metal and metal oxide are obtainable in a similar manner, examples being 2-D nanomaterials coated with Sn, Ge, Co, $SnO_2$, $TiO_2$, $Fe_2O_3$, and $Fe_3O_4$. Particularly the embodiment of the invention wherein a mixture according to (a1) is provided in step (a) and wherein graphene oxide is converted into graphene in step (d) represents a simple route to coated 2-D nanomaterials based on graphene proceeding from the comparatively inexpensively and widely available starting material graphene oxide. This route is also very useful for producing graphene from graphene oxide.

The 2-D sandwich nanomaterials obtainable according to the present invention have a very high length to thickness ratio and a very high specific surface area with very uniformly formed mesoporous structures, which is due to the surfactant molecules originally used in step (a) and can be varied through the use of different surfactants. 2-D sandwich nanomaterials obtained by the process of the present invention have good performance characteristics in that, for example, graphene particles of the present invention which are coated with mesoporous carbon exhibit very good properties when used as an anode material in lithium ion secondary batteries.

The invention will now be described in detail.

In the context of the present invention, "graphite" is to be understood as meaning carbon which consists of many planar, mutually superposed layers formed by fused six-membered rings of $sp^2$-hybridized carbon atoms.

"Graphene" is strictly speaking understood to be a single carbon layer from the graphite structure, i.e., a single layer of hexagonally arranged, fused rings consisting of six carbon atoms having $sp^2$ hybridization.

For the purposes of the present invention, "graphene" refers to materials formed from up to 10 layers, preferably from up to 5 layers, more preferably from up to 2 layers and even more preferably from 1 layer of hexagonally arranged, fused rings each consisting of 6 $sp_2$-hybridized carbon atoms.

"Graphite oxide" refers to a three-dimensional structure constructed of layers, individual layers of which consist of fused $C_6$-rings partly functionalized with carbonyl, carboxyl, alcohol and epoxy groups. These individual layers are no longer planar as in graphite, but project wholly, depending on the degree of oxidation, or partly from the plane in a zigzag shape.

"Graphene oxide" for the purposes of the present invention is to be understood as meaning materials formed from up to 10 layers, preferably from up to 5 layers, more preferably from up to 2 layers and even more preferably from a single layer which are formed from fused $C_6$-rings bearing oxygen-functional groups such as epoxy, alcohol, carboxyl and/or carbonyl groups.

The term "particles" is used in the context of the present invention as a collective term for graphene oxide particles and graphene particles.

"Two-dimensional nanomaterials and sandwich nanomaterials" in the context of the present invention are platelet-shaped particles which are in principle infinite in two directions, yet are confined in the third direction to a dimension ranging from 0.3 nm to 500 nm including any coating present, as measured via electron microscopy. The present invention sandwich particles based on graphene or graphene oxide are coated on their top surface and on their bottom surface, and have a layer-shaped structure in the form of a sandwich with the sequence coating/graphene or graphene oxide/coating. The coating may consist of one or more layers.

Step (a) of the process of the present invention comprises providing a mixture comprising as per (a1) graphene oxide particles, water and at least one cationic surfactant and/or nonionic surfactant, or as per (a2) graphene particles, at least one solvent useful for solution exfoliation of graphite, and at least one cationic surfactant and/or nonionic surfactant.

Graphite oxide particles will typically be used to provide the mixture according to (a1). The production of graphite oxide particles is known to a person skilled in the art; typically, graphite oxide is produced by oxidation of graphite. Oxidation causes oxygen atoms to be incorporated in the graphite to form primarily alcohol, epoxy, carbonyl and carboxyl groups. These groups expand the gaps between the individual layers and the layers become easier to separate from each other. The oxidized layers of graphite are also made more hydrophilic and better dispersible in water by the oxygen-containing groups.

The production of oxidized graphite is known to a person skilled in the art; typically it involves treating graphite with an oxidizing agent and an acid, more particularly a strong acid. Oxidizing agents used are more particularly chlorates and permanganates, and particularly sulfuric acid and nitric acid are used as acid.

L. Staudenmaier, Ber. Dt. Chem. Ges. 31, (1898), 1481, and L. Staudenmaier, Ber. Dt. Chem. Ges. 32, (1899), 1394, describe the production of oxidized graphite (called graphitic acid in the references) by reaction of graphite with potassium chlorate in the presence of fuming nitric acid and concentrated sulfuric acid.

W. S. Hummers, R. E. Offeman, J. Am. Chem. Soc. 80 (1958), 1339, describe the production of oxidized graphite by reaction of graphite with sodium nitrate and potassium permanganate in the presence of sulfuric acid.

It is also possible to use expandable graphite as a precursor for the production of oxidized graphite. In this case, the graphite is expanded in the first step. The product obtained is then ground in a ball mill for example. The last step is the chemical modification as described above either by thermal oxidation or by oxidation in the presence of sulfuric acid.

The mixture further comprises water and also at least one cationic surfactant and/or nonionic surfactant. Suitable surfactants are described hereinbelow.

When providing the mixture as per (a1) by proceeding from graphite oxide particles, the graphite oxide particles are at least partly exfoliated into graphene oxide particles, and so the mixture comprises graphene oxide particles.

To provide the mixture as per (a2), graphite particles will typically be suspended in at least one suitable solvent. In the process, the graphite particles are solution exfoliated in the organic solvent into individual layers to obtain a suspension of graphene particles in the at least one aprotic solvent. This can be achieved with solvents whose surface energy is approximately equal to that of graphene. Solvents having a surface energy of 55 to 90 mJ/m$^2$ should ensure exfoliation of graphite particles in graphene particles (Hernandez et al., arXiV: 0805.2850 v1). Examples of suitable solvents are N,N-dimethylacetamide, γ-butyrolactone, 1,3-dimethyl-2-imidazolidinone and N-methyl-pyrrolidone.

Solvents useful for the solution exfoliation of graphite further include dimethylformamide, dimethyl sulfoxide, tetrahydrofuran, dimethylacetamide and cyclohexane.

Preference according to the present invention is given to using solvents selected from the group consisting of N-methylpyrrolidone, dimethylformamide, dimethyl sulfoxide, tetrahydrofuran, dimethylacetamide and cyclohexane; dimethylformamide is particularly preferred.

Naturally occurring graphite and also artificially produced graphite can be used with pyrographite, electrographite and expanded graphite being particularly suitable.

The mixture provided in (a), whether according to (a1) or according to (a2), further comprises at least one cationic and/or nonionic surfactant.

Cationic surfactants are preferably selected from the group of quaternary ammonium compounds, more preferably from $C_nH_{2n+1}N(R)_3Hal$ where n=12, 14, 16 and 18, Hal=Cl and Br and R=$CH_3$ or $C_2H_5$, wherein each R is the same or different, particular preference being given to cetyltrimethylammonium chloride, cetyltrimethylammonium bromide and cetyltriethylammonium bromide.

The at least one nonionic surfactant is preferably selected from the group of $C_2$-$C_4$-alkylene oxide block copolymers comprising ethylene oxide as marketed for example by BASF SE under the name Pluronic®.

The presence of the at least one cationic and/or nonionic surfactant avoids problems in respect of the incompatibility of graphene/graphene oxide and inorganic materials, and also aggregation problems. The cationic and/or nonionic surfactants are electrostatically adsorbed on the surface of the strongly negatively charged graphene oxide or adsorbed onto the surface of the graphene via interactions with the π-electrons of the graphene structure, and self-assemble into regular microstructures on the top and bottom surfaces of the graphene or graphene oxide particles. For instance, cetyltrimethylammonium bromide adsorbed on graphene oxide particles will form tubular micelles which, after application of the coating, produce mesopores about 2 nm in size.

To provide the mixture as per (a1) comprising graphene oxide particles, water and at least one cationic surfactant and/or nonionic surfactant, or a mixture as per (a2) comprising graphene particles, at least one solvent useful for solution exfoliation of graphite, and at least one cationic surfactant and/or nonionic surfactant, the respective mixture starting from graphite oxide particles or, respectively, graphite particles will typically be treated through energy input in order that the exfoliation of the graphite oxide particles or, respectively, graphite particles in the respective mixture into graphene oxide particles or, respectively, graphene oxide particles may be facilitated and improved. This is achieved for example via ultrasound, stirring, shaking and other methods known to a person skilled in the art. And stirring, grinding and dispersing devices known to a person skilled in the art, such as an Ultra-Turrax® stirrer, can be used.

To provide the mixture as per (a1), the present invention preferably proceeds from a mixture comprising 0.005% to 5% by weight of graphite oxide, more preferably 0.01% to 5% by weight of graphite oxide particles and even more preferably 0.01% to 2% by weight of graphite oxide particles, based on the total weight of the mixture. The concentration of the at least one cationic surfactant and/or nonionic surfactant is preferably in the range from 0.1% to 10% by weight, more preferably in the range from 0.2% to 5% by weight and most preferably in the range from 0.2% to 1% by weight, based on the total weight of the mixture.

To provide the mixture as per (a2), the present invention preferably proceeds from a mixture comprising 0.01% by weight of graphite particles, more preferably 0.5% by weight of graphite particles and most preferably 1% by weight of graphite particles, based on the total weight of the mixture. The mixture comprises preferably from 0.1% to 10% by weight, more preferably from 0.2% to 5% by weight and most preferably from 0.2% to 1% by weight of at least one cationic and/or nonionic surfactant, based on the total weight of the mixture.

If not all the graphite oxide particles or graphite particles are exfoliated into single-layered graphene oxide particles and graphene particles, respectively, in the providing of the mixture, at least some of the nonexfoliated particles can be removed from the mixture by careful centrifugation for example.

According to the present invention, the mixture provided in step (a1) preferably comprises from 0.005% to 5% by weight, and more preferably from 0.01% to 5% by weight of graphene oxide particles and the mixture provided in step (a2) preferably comprises from 0.001% to 5% by weight and more preferably from 0.01% to 1% by weight of graphene particles, all based on the total weight of the mixture.

Step (b) of the process of the present invention comprises adding at least one sol precursor compound to the mixture obtained from step (a). "Sol precursor compound" herein refers to a compound which, under the conditions prevailing in the particular mixture, forms a so-called sol. "Sol" here is to be understood as the term which is used in the context of the "sot-gel process" known to a person skilled in the art. Within the "sol-gel process" a sol precursor is first converted into a sol and then into a gel. The sol-gel process is described for example in W. Stober et al., J. Colloid Intel. Sci 26 (1968), page 62.

It is preferable according to the present invention for the at least one sol precursor compound to be selected from the group consisting of $SiO_2$ precursor compounds, $ZrO_2$ precursor compounds, $TiO_2$ precursor compounds, $CeO_2$ precursor compounds, $Al_2O_3$ precursor compounds, $Fe_2O_3$ precursor compounds, $Fe_3O_4$ precursor compounds, MgO precursor compounds, ZnO precursor compounds, chromium oxide precursor compounds, $CO_2O_3$ precursor compounds, molybdenum oxide precursor compounds, tungsten oxide precursor compounds, hafnium oxide precursor compounds, $Y_2O_3$ precursor compounds and water-soluble crosslinkable polymers and polymer precursors. The at least one sol precursor compound is preferably selected from the group consisting of metal halides, metal nitrates, metal carboxylates, metal oxysulfates, metal acetylacetonates and metal alkoxides and also waterglass for Si, wherein the metal is selected from the group consisting of Zn, Mg, Al, Y, Fe, Cr, Co, Si, Zr, Ti, Ce, Mo, W and Hf.

According to the present invention, the metal alkoxides are preferably selected from $Me(OR)_n$ where
n=2 for Me=Zn, Mg,
n=3 for Me=Al, Y, Fe, Cr, Co,
n=4 for Me=Si, Zr, Ti, Ce, Mo, W, Hf and
R=$C_1$- to $C_8$-alkyl, which may be substituted with one or more OH groups, wherein each R may be the same or different.

It is very particularly preferable for the at least one sol precursor compound to be selected from waterglass, and $Si(OR)_4$ where R=H, $CH_3$, $C_2H_8$, $C_2H_4OH$, n-$C_3H_7$, i-$C_3H_7$, n-$C_4H_9$, and t-$C_4H_9$, wherein R may be the same or different.

According to the present invention, the water-soluble crosslinkable polymers and polymer precursors are preferably selected from melamine-formaldehyde resin precursors and resorcinol-formaldehyde resin precursors.

The at least one sol precursor compound in step (b) will typically be added to the mixture from step (a) slowly and in a liquid state. It can be added in solution or without a solvent. The concentration of the added at least one sol precursor compound in step (b) will typically be in the range from 0.1% to 10% by weight, preferably in the range from 0.2% by weight to 5% by weight, and more preferably in the range from 0.2% to 1% by weight, based on the graphene oxide particles or, respectively, graphene particles present in the mixture (a).

Depending on the sol precursor compound used, catalysts for sol and/or gel formation such as acids or bases can be added in or before step (b).

The surfactant molecules adsorbed on the graphene oxide particles or, respectively, graphene particles and self-assembled into mesoporous structures form a molecular template for the controlled nucleation and growth of the sol or gel forming from the at least one sol precursor compound on the surface of the graphene oxide particles or, respectively, the graphene particles.

Step (c) of the process of the present invention comprises reacting the mixture from step (b) in a sol-gel process, wherein the gel deposits on the surface of the graphene oxide or graphene particles in a heterogeneous nucleation process, owing to the surfactant molecules adsorbed on the surface of the graphene oxide or, respectively, graphene particles, instead of depositing in the solvent in a homogeneous nucleation process. This is known to a person skilled in the art as a liquid-crystalline templating mechanism (GS Arttard, Nature 378 (1995), pages 366-368). In the process, the sol precursor compound converts to the sol and further to the gel.

Step (c) is typically carried out over a period of 0.5 hour to 2 days, preferably 1 hour to 24 hours and more preferably 2 hours to 18 hours. The temperature in step (c) is typically in the range from 10 to 80° C., depending on the system, more particularly the solvent and/or dispersant used.

The graphene oxide particles and graphene particles subsequently display a coating with this particular gel on both the top and bottom surfaces. The gel will have become arranged in accordance with the template formed by the at least one cationic surfactant and/or nonionic surfactant on the surfaces of the particles. This leads to a homogeneous and structured coating of the surfaces of the particles with the gel.

The coated graphene oxide particles and graphene particles can then be further processed, for example separated off and/or dried.

Following step (c), the surfactant molecules are removed in step (d) from the coated graphene oxide particles or, respectively, the coated graphene particles by washing or heating. The coated particles can be washed with water or solvents such as methanol, ethanol and propanol for example. However, the surfactant molecules can also be removed by heating to temperatures of 50 to 500° C. in an inert atmosphere. The removing of the surfactant particles can also take place during the heating of the graphene oxide particles in step (e) to convert the graphene oxide into graphene, so that steps (d) and (e) can be carried out together. The surfactant molecules can also be removed in an optionally performed calcining step (see hereinbelow).

After the coated particles have been removed and dried, a calcining process can additionally follow, in which case the coated particles are calcined at elevated temperatures in the presence of an oxygen-containing gas or of an inert gas. In the case of $SiO_2$-coated particles, for example, calcination for two or more hours, for example from 2 to 8 hours, at 5 to 600° C. in the presence of air is suitable.

The coated particles comprise in the dry state typically from 75% by weight to 95% by weight, preferably from 80% by weight to 92% by weight and more preferably from 85% by weight to 90% by weight of graphene oxide or, respectively, graphene and typically from 5% by weight to 25% by weight, preferably from 8% by weight to 20% by weight and more preferably from 10% by weight to 15% by weight of coating formed from the gel, based on the weight of the coated particles.

When step (a) provides a mixture according to (a1), the coated graphene oxide particles are optionally heated to at least 500° C. under inert gas atmosphere for at least 1 min in order that the graphene oxide may be reduced to graphene (step (e)). Preferably, the coated graphene oxide particles are heated under inert gas atmosphere for at least 30 min and more preferably for at least one hour. The heating is typically not performed for longer than 12 hours and preferably not for longer than 6 hours. The temperature involved is preferably in the range from 500° to 1000° C.

In this embodiment of the invention, the process comprises the steps of
(a) providing
  (a1) a mixture comprising graphene oxide particles, water and at least one cationic surfactant and/or nonionic surfactant,
(b) adding at least one sol precursor compound to the mixture from step (a),
(c) reacting the mixture from step (b) in a sol/gel process to form gel on the graphene oxide particles,
(d) removing the at least one surfactant, and
(e) optionally heating the coated graphene oxide particles for at least 1 min to at least 500° C. under inert gas atmosphere to reduce the graphene oxide to graphene, wherein it is particularly preferable to actually carry out step (e).

In a particularly preferred embodiment, the processes described above are carried out by selecting in step (b) the at least one sol precursor compound from $SiO_2$ precursor compounds, more particularly from waterglass and $Si(OR)_4$ where R is selected from H, $CH_3$, $C_2H_5$, $C_2H_4OH$, $n-C_3H_7$, $i-C_3H_7$, $n-C_4H_9$ and $t-C_4H_9$, wherein R may be the same or different.

The $SiO_2$-coated 2-D sandwich nanomaterials based on graphene and/or on graphene oxide which are in accordance with the present invention, are particularly suitable for use as templates for producing further 2-D sandwich nanomaterials. The present invention accordingly further provides a process comprising the above-described steps, wherein the at least one sol precursor compound in step (b) is selected from $SiO_2$ precursor compounds and the process further comprises the following steps:

(f) impregnating the $SiO_2$-coated graphene oxide particles or, respectively, the $SiO_2$-coated graphene particles with at least one precursor compound selected from the group consisting of metal oxide precursor compounds, metal precursor compounds and carbon precursor compounds, (g) converting the at least one precursor compound into the corresponding metal oxide, the corresponding metal or, respectively, carbon, and (h) removing the $SiO_2$ from the graphene oxide particles or, respectively, the graphene particles.

The process according to this embodiment thus altogether comprises the steps of (a) providing
  (a1) a mixture comprising graphene oxide particles, water and at least one cationic surfactant and/or nonionic surfactant or
  (a2) a mixture comprising graphene particles, at least one solvent useful for solution exfoliation of graphite and at least one cationic surfactant and/or nonionic surfactant, (b) adding at least one sol precursor compound selected from $SiO_2$ precursor compounds to the mixture from step (a), (c) reacting the mixture from step (b) in a sol/gel process to form gel from the at least one sol precursor compound on the graphene oxide particles or, respectively, the graphene particles, (d) removing the at least one surfactant, (e) optionally heating the gel-coated graphene oxide particles for at least 1 min to at least 500° C. under inert gas atmosphere to reduce the graphene oxide to graphene, (f) impregnating the $SiO_2$-coated graphene oxide particles or, respectively, the $SiO_2$-coated graphene particles with at least one precursor compound selected from the group consisting of metal oxide precursor compounds, metal precursor compounds and carbon precursor compounds, (g) converting the at least one precursor compound into the corresponding metal oxide, the corresponding metal or, respectively, carbon, and (h) removing the $SiO_2$ from the graphene oxide particles or, respectively, the graphene particles.

Step (f) comprises impregnating the $SiO_2$-coated graphene oxide particles or the $SiO_2$-coated graphene particles with at least one metal oxide precursor compound, with at least one metal precursor compound and/or with at least one carbon precursor compound. The respective precursor compounds end up filling the spaces/pores in the $SiO_2$ coating which were originally filled by the surfactant molecules.

The at least one metal oxide precursor compound and/or the at least one metal precursor compound is preferably selected from the group of metal halides, metal nitrates, metal alkoxides, metal sulfates, metal carboxylates and metal oxysulfates. The at least one carbon precursor compound is preferably selected from the group consisting of sucrose, glucose and pitch.

The $SiO_2$-coated particles can be impregnated using the customary methods known to a person skilled in the art for processes of the type in question. These include for example the wet-impregnation method, wherein the porous material to be impregnated is suspended in an excess of the corresponding precursor solution and stirred therein for some time, for example for 1 to 24 hours, and the excess solution is subsequently removed by filtering off. Another suitable method is the incipient-wetness method, wherein the porous material to be impregnated is admixed with a solution of the corresponding precursor compound, the amount of the solution of the corresponding precursor compound being equal to the pore volume of the porous material. The suspension obtained in the process can be mechanically commixed.

Useful solvents for the metal and/or metal oxide precursor compound and/or the carbon precursor compound include water and/or alcohols such as methanol, ethanol and propanol. The concentration of precursor compound(s) in the impregnating solution is typically in the range from 10% to 30% by weight and preferably in the range from 15% to 25% by weight, based on the total weight of the impregnating solution.

Typically, the precursor compound is used in a weight ratio of precursor compound to uncoated particles in the range from 0.1:1 to 50:1, preferably in the range from 0.5:1 to 20:1 and more preferably in the range from 1:1 to 10:1.

After impregnation, the particles are typically separated off, optionally washed and dried.

Step (g) comprises treating the impregnated particles at elevated temperatures in order that the particular precursor compound may be converted into the desired compound. Particles impregnated with carbon precursor compounds are typically heated to a temperature in the range from 600 to 900° C., preferably to a temperature in the range from 650 to 850° C. and more preferably to a temperature in the range from 700 to 800° C. in an inert gas atmosphere, typically for a period in the range from 1 h to 5 h and preferably in the range from 2 h to 4 h. To convert a metal oxide precursor compound, the impregnated particles are typically heated to a temperature in the range from 200 to 500° C. and preferably to a temperature in the range from 300 to 400° C. in an oxygen-containing atmosphere, for example air, for typically 2 h to 10 h and preferably for 4 h to 8 h. To convert the metal precursor compound, the impregnated coated particles are typically heated to a temperature in the range from 200° C. to 600° C. and preferably in the range from 300° C. to 500° C. in a reductive atmosphere, for example in the presence of hydrogen, typically for a period in the range from 4 h to 10 h and preferably in the range from 5 h to 8 h.

The silicon dioxide is removed in step (h) by dissolving in aqueous sodium hydroxide solution or HF for example. The coated particles can be stirred for example in an excess of aqueous sodium hydroxide solution for 12 to 24 hours at room temperature with repeated changes of the aqueous sodium hydroxide solution.

The process described in steps (f) to (h) is known in principle to a person skilled in the art and is referred to as nanocasting. A description of this process may be found for example in A. Rumplecker et al., Chem. Mater. 19 (2007), page 485.

In one embodiment of the present invention, said steps (f), (g) and (h) are independently repeated one or more times singly or jointly. For example, an impregnating step can be carried out repeatedly in order that a high loading of the coated particles with the precursor compounds may be achieved. Similarly, the conversion of the at least one precursor compound can be carried out repeatedly in order that very substantially complete conversion may be achieved. Step (h) can likewise be carried out repeatedly in succession, in which case the repeats may each use the same or different solvents for the $SiO_2$.

The coated particles comprise in the dried state typically from 70% by weight to 95% by weight, preferably from 80% by weight to 95% by weight and more preferably from 85% by weight to 90% by weight of graphene oxide or graphene and typically from 5% by weight to 30% by weight, preferably from 5% by weight to 20% by weight and more preferably from 10% by weight to 15% by weight of coating selected from carbon, metals and/or metal oxides, based on the weight of the coated particles.

The present invention further provides two-dimensional sandwich nanomaterials obtainable by the processes described above.

The present invention further provides for the use of the sandwich nanomaterials obtainable by the above-described processes as templates for producing further nanolayer materials. This can take place according to the principles mentioned above, known as nanocasting to a person skilled in the art. In nanocasting, "positives" and "negatives" of the structures formed by the self-assembling surfactant molecules in step (a) are produced in each case. Thus, in step (c), $SiO_2$ forms a coating in which, following removal of the surfactant molecules, the spaces/pores originally filled by the surfactant molecules are filled by impregnating with a carbon precursor compound for example. The carbon precursor compound can subsequently be converted into carbon which has the three-dimensional structure originally formed by the surfactant molecules. The $SiO_2$ can then be removed to leave a microporous structure of carbon. This structure can then likewise be re-impregnated with a precursor compound, for example a metal oxide precursor compound, and the carbon removed by heating in an oxygen-containing atmosphere to leave a metal oxide layer having the structure of the original $SiO_2$ layer.

The present invention further provides for the use of the two-dimensional sandwich nanomaterials obtainable by the processes described above, in catalysts, sensors, capacitors, primary and secondary electrochemical cells and fuel cells, and also catalysts, sensors, capacitors, primary and secondary electrochemical cells and fuel cells comprising a two-dimensional sandwich nanomaterial obtainable according to the processes described above.

The two-dimensional sandwich nanomaterials obtainable by the processes described above can also be used for producing graphene particles. This process for producing graphene particles likewise proceeds from the preferred embodiment described above, comprising said steps (a) to (e), in which the at least one sol precursor compound in step (b) is selected from $SiO_2$ precursor compounds. When step (a) provides a mixture according to (a1), step (e) is carried out in order that the graphene oxide particles may be converted into graphene particles. Step (e) is then followed directly by step (h) (removal of the $SiO_2$ from the graphene oxide particles). Specifically, this embodiment of the invention comprises the steps of (a) providing
    (a1) a mixture comprising graphene oxide particles, water and at least one cationic surfactant and/or nonionic surfactant or
    (a2) a mixture comprising graphene particles, at least one solvent useful for solution exfoliation of graphite and at least one cationic surfactant and/or nonionic surfactant, (b) adding at least one sol precursor compound selected from $SiO_2$ precursor compounds to the mixture from step (a), (c) reacting the mixture from step (b) in a sol/gel process to form gel on the graphene oxide particles or the graphene particles, (d) removing the at least one surfactant, and (e) optionally heating the coated graphene oxide particles for at least 1 min to at least 500° C. under inert gas atmosphere to reduce the graphene oxide to graphene when step (a) provides a mixture according to (a1), and (g) removing the $SiO_2$.

It is particularly preferable here to produce the graphene particles from graphene oxide. The corresponding process comprises the steps of (a) providing
    (a1) a mixture comprising graphene oxide particles, water and at least one cationic surfactant and/or nonionic surfactant or (b) adding at least one sol precursor compound selected from $SiO_2$ precursor compounds to the mixture from step (a), (c) reacting the mixture from step (b) in a sol/gel process to form gel on the graphene oxide particles, (d) removing the at least one surfactant, and (e) heating the coated graphene oxide particles for at least 1 min to at least 500° C. under inert gas atmosphere to reduce the graphene oxide to graphene and (f) removing the $SiO_2$.

The present invention also comprises the use of the two-dimensional sandwich nanomaterials obtainable by the processes described above, for producing graphene particles.

Embodiments of the present invention will now be more particularly described by way of example.

EXAMPLE 1

Production of $SiO_2$-Coated Graphene Oxide Particles

Graphene oxide was produced from natural graphite flakes as per the process of Hummers (Hummers, W. S. & Offeman, R. E.; J. Am. Chem. Soc. 80 (1958), pages 1339 to 1139). 30 mg of the graphene oxide thus synthesized were initially suspended in an aqueous solution comprising 1 g of cetyltrimethylammonium bromide, 40 mg of NaOH in 500 ml of demineralized water and ultrasonicated for 3 hours. The suspension was subsequently stirred at 40° C. with a magnetic stirrer-bar for 2 hours and 1 ml of tetraethyl orthosilicate (TEOS) was slowly added to the suspension. The mixture was allowed to react for 12 hours and the $SiO_2$-coated graphene oxide particles were subsequently washed with warm ethanol, separated off and dried at 80° C. for 6 hours.

Electron-microscopic examination by field emission scanning electron microscope and transmission electron microscope revealed that the particles had a size of 200 nm to several μm and a mesoporous structure about 2 nm in size. No free silica particles or uncoated graphene oxide particles were seen. This suggests that, as expected, most of the surfactant molecules were adsorbed on the surface of the graphene oxide particles through electrostatic interactions, and so that heterogeneous nucleation of the tetraethyl orthosilicate on the graphene oxide surface was preferential to homogeneous nucleation in the solution. The thickness of the particles was determined by atomic force microscopy analysis perpendicularly to the main plane of the flat particles and found to be a uniform thickness of 28±1 nm.

EXAMPLE 2

Production of $SiO_2$-Coated Graphene Particles from $SiO_2$-Coated Graphene Oxide Particles The graphene oxide particles produced as per example 1, coated with mesoporous $SiO_2$, were produced by pyrolyzing the coated graphene oxide particles at 800° C. for 3 hours in argon. This gives an efficient reduction of the graphene oxide into graphene without aggregation of the particles, since the particles are protected by the $SiO_2$ coating. The morphology and structure of the $SiO_2$-coated graphene particles remain stable during the heat treatment, and the mesoporous structure remained intact during the pyrolysis, as was evidenced by scanning electron and transmission electron micrographs. The $SiO_2$-coated graphene particles obtained from example 2 were examined by nitrogen adsorption and were found to exhibit a type IV nitrogen adsorption isotherm characteristic of uniform mesopores. Pore size distribution was computed according to Barrett-Joyner-Halenda at 2 nm. The adsorption data indicated a very high specific surface area of 980 $m^2g^{-1}$, which is comparable to values for conventionally produced mesoporous silicon dioxide.

EXAMPLE 3

Production of Graphene Particles Coated with Mesoporous Carbon

The $SiO_2$-coated graphene particles of example 2 were repeatedly impregnated with a solution of sucrose in ethanol at 40° C. by stirring in an impregnation in which the ratio of sucrose to $SiO_2$-coated graphene particles in the end product was fixed at 2:1. The sucrose-impregnated particles were subsequently dried and pyrolyzed at 700° C. for 3 hours in an argon atmosphere. The particles obtained were subsequently freed of the $SiO_2$ in aqueous NaOH solution to obtain graphene particles coated with mesoporous carbon.

Electron-microscopic examination of the carbon-coated particles revealed that the carbon layers had a high monodispersity of the structure with the same size as the $SiO_2$-coated particle used as template. X-ray studies revealed that the carbon in the coating is present therein in amorphous form. Examination by nitrogen adsorption and desorption revealed a specific surface area (as per Brunauer-Emmett-Teller) of 910 $M^2g^{-1}$. The particles exhibited a type IV isotherm, suggestive of the existence of a large number of mesopores and micropores in the carbon-coated graphene particles.

EXAMPLE 4

Production of $Co_3O_4$-Coated Graphene Particles

The $SiO_2$-coated graphene particles of example 2 were repeatedly impregnated with solutions of cobalt nitrate in ethanol at 40° C. by stirring in an impregnation in which the weight ratio of cobalt nitrate to $SiO_2$-coated graphene particles was 2.3:1. The particles impregnated with cobalt nitrate were heated at 350° C. for 5 hours in air. The $SiO_2$ was subsequently removed from particles in aqueous NaOH solution. Examination with a high resolution transmission electron microscope showed that the $Cu_3O_4$ had a mesoporous yet crystalline structure.

EXAMPLE 5

Use of Carbon-Coated Graphene Particles in Lithium Ion Secondary Batteries

The electrochemical examinations were carried out in 2032 button cells. The working electrodes were produced by mixing carbon-coated graphene particles of example 3, carbon black (Super-P) and poly(vinyl difluoride) (PVDF) in a weight ratio of 80:10:10 and brushing onto copper foil (99.6%, Goodfellow). Lithium foil was used as counter-electrode. The electrolyte consisted of a unimolar solution of $LiPF_6$ in ethylene carbonate (EC) and dimethyl carbonate (DMC) (volume ratio 1:1; Industries Ltd). The cells were assembled in an argon-filled glovebox, wherein the concentration of moisture and oxygen was in each case below 1 ppm. The electrochemical power output was measured at various charging/discharging rates in the voltage range from 0.01 to 3.00 V. The results are shown in tables 1 and 2.

TABLE 1

Discharging/charging capacities of electrode from example 5 (inventive) at 74 mA/g current density

| | discharging/charging cycle | | | | | |
|---|---|---|---|---|---|---|
| | 1. | 2. | 5. | 10. | 20. | 30. |
| capacity [mAh/g] in discharging | 1669 | 955 | 837 | 791 | 782 | 799 |
| capacity [mAh/g] in charging | 915 | 848 | 789 | 764 | 753 | 771 |

TABLE 2

Capacities of electrode from example 5 (inventive) as function of charging/discharging current

| | 0.2 C | 1 C | 5 C | 10 C | 20 C |
|---|---|---|---|---|---|
| reversible capacity [mAh/g] | 771 | 546 | 370 | 315 | 221 |

We claim:
1. A process for producing a two-dimensional nanomaterial comprising:
 (a) adding at least one sol precursor compound selected from the group consisting of metal halides, metal nitrates, metal carboxylates, metal oxysulfates, metal acetylacetonates and metal alkoxides and also waterglass for Si, wherein the metal is selected from the group consisting of Zn, Mg, Al, Y, Fe, Cr, Co, Si, Zr, Ti, Ce, Mo, W and Hf to
  (a1) a mixture comprising graphene oxide particles, water and at least one cationic surfactant and/or nonionic surfactant, or
  (a2) a mixture comprising graphene particles, at least one solvent selected from the group consisting of N,N-dimethylacetamide, γ-butyrolactone, 1,3-dimethyl-2-imidazolidinone, N-methyl-pyrrolidone, dimethylformamide, dimethyl sulfoxide, tetrahydrofuran, and cyclohexane and at least one cationic surfactant and/or nonionic surfactant,
  to form mixture (a)
 (b) reacting mixture (a) in a sol/gel process to form gel from the at least one sol precursor compound on the graphene oxide particles or, respectively, the graphene particles,
 (c) removing the at least one surfactant, and

(d) optionally heating the gel-coated graphene oxide particles for at least 1 min to at least 500° C. under inert gas atmosphere to reduce the graphene oxide to graphene, wherein the two-dimensional nanomaterial produced is confined in a third dimension to a range of 0.3 nm to 500 nm including any coating.

2. The process according to claim 1 wherein mixture (a) comprises at least one cationic surfactant selected from the group of quaternary ammonium compounds.

3. The process according to claim 1 wherein mixture (a) comprises at least one nonionic surfactant selected from the group of $C_2$-$C_4$-alkylene oxide block copolymers comprising ethylene oxide.

4. The process according to claim 1 wherein the at least one sol precursor compound is selected from the group consisting of metal halides, metal nitrates, metal carboxylates, metal oxysulfates, metal acetylacetonates and metal alkoxides, wherein the metal is selected from the group consisting of Zn, Mg, Al, Y, Fe, Cr, Co, Si, Zr, Ti, Ce, Mo, W and Hf.

5. The process according to claim 1 wherein the at least one sol precursor compound is selected from $SiO_2$ precursor compounds.

6. The process according to claim 5, further comprising:
(e) impregnating the $SiO_2$-coated graphene oxide particles or, respectively, the $SiO_2$-coated graphene particles with at least one precursor compound selected from the group consisting of metal oxide precursor compounds, metal precursor compounds and carbon precursor compounds,
(f) converting the at least one precursor compound into the corresponding metal oxide, the corresponding metal or, respectively, carbon, and
(g) removing the $SiO_2$ from the graphene oxide particles or, respectively, the graphene particles.

7. The process according to claim 6 wherein (e), (f) and (g) are independently repeated one or more times singly or jointly.

8. The process according to claim 6, comprising impregnating the $SiO_2$-coated graphene oxide particles or, respectively, the $SiO_2$-coated graphene particles with at least one precursor compound selected from the group consisting of metal oxide precursor compounds and metal precursor compounds,
wherein the metal oxide precursor compounds and the metal precursor compounds are selected from the group consisting of metal halides, metal nitrates, metal alkoxides, metal sulfates, metal carboxylates and metal oxysulfates.

9. The process according to claim 6, comprising impregnating the $SiO_2$-coated graphene oxide particles or, respectively, the $SiO_2$-coated graphene particles with at least one precursor compound selected from the group consisting of carbon precursor compounds,
wherein the carbon precursor compounds are selected from the group consisting of sucrose, glucose and pitch.

10. The process according to claim 6 wherein the converting of the at least one precursor compound in (f) is effected by heating the impregnated graphene oxide particles or, respectively, graphene particles.

11. The process according to claim 6 wherein the $SiO_2$ is removed in (g) by dissolving an aqueous sodium hydroxide solution or HF.

12. A process for producing graphene particles according to claim 5, further comprising removing the $SiO_2$ from the graphene particles,
wherein (d) is carried out when the at least one sol precursor compound is added to (a1) a mixture comprising graphene oxide particles, water and at least one cationic surfactant and/or nonionic surfactant.

13. The process according to claim 1 wherein the at least one sol precursor compound is selected from waterglass and $Si(OR)_4$ where R is selected from H, $CH_3$, $C_2H_5$, $C_2H_4OH$, n-$C_3H_7$, i-$C_3H_7$, n-$C_4H_9$, and i-$C_4H_9$, wherein R may be the same or different.

14. The process according to claim 1, comprising adding the at least one sol precursor compound to said mixture comprising graphene oxide particles, water and at least one cationic surfactant and/or nonionic surfactant.

15. The process according to claim 14, comprising heating the gel-coated graphene oxide particles for at least 1 min to at least 500° C. under inert gas atmosphere to reduce the graphene oxide to graphene.

16. The process according to claim 1, comprising adding the at least one sol precursor compound to said mixture comprising graphene particles, at least one solvent selected from the group consisting of N,N-dimethylacetamide, γ-butyrolactone, 1,3-dimethyl-2-imidazolidinone, N-methyl-pyrrolidone, dimethylformamide, dimethyl sulfoxide, tetrahydrofuran, and cyclohexane and at least one cationic surfactant and/or nonionic surfactant.

17. The process according to claim 1, comprising:
(a) adding said at least one sol precursor compound to (a1) a mixture comprising graphene oxide particles, water and at least one cationic surfactant and/or nonionic surfactant to form mixture (a), and
(b) reacting mixture (a) in a sol/gel process for from 2 to 18 hours at 10 to 80° C. to form gel from the at least one sol precursor compound on the graphene oxide particles,
and wherein said process produces coated graphene oxide particles comprising 80-92% by weight of graphene oxide and 8-20% by weight of coating formed from the gel.

18. The process according to claim 1, comprising:
(a) adding said at least one sol precursor compound to (a2) a mixture comprising graphene particles, at least one solvent selected from the group consisting of N,N-dimethylacetamide, γ-butyrolactone, 1,3-dimethyl-2-imidazolidinone, N-methyl-pyrrolidone, dimethylformamide, dimethyl sulfoxide, tetrahydrofuran, and cyclohexane and at least one cationic surfactant and/or nonionic surfactant to form mixture (a), and
(b) reacting mixture (a) in a sol/gel process for from 2 to 18 hours at 10 to 80° C. to form gel from the at least one sol precursor compound on the graphene particles,
and wherein said process produces coated graphene particles comprising 80-92% by weight of graphene oxide and 8-20% by weight of coating formed from the gel.

* * * * *